United States Patent

Hawlas et al.

[11] Patent Number: 5,899,054
[45] Date of Patent: May 4, 1999

[54] DRIVE SYSTEM FOR AGRICULTURAL LARGE BALER

[75] Inventors: Martin Hawlas, Harsewinkel; Ansgar Nonhoff, Coesfeld; Egbert Scholz, Rheda, all of Germany

[73] Assignee: Claas KGaA, Harsewinkel, Germany

[21] Appl. No.: 08/892,344

[22] Filed: Jul. 14, 1997

[30] Foreign Application Priority Data

Jul. 16, 1996 [DE] Germany .......................... 196 28 606

[51] Int. Cl.⁶ .................................................. A01D 39/00
[52] U.S. Cl. .................................. 56/341; 56/343; 100/88
[58] Field of Search ............................ 52/341, 343, 434, 52/446, 450; 100/88

[56] References Cited

U.S. PATENT DOCUMENTS

| | | | |
|---|---|---|---|
| 4,135,444 | 1/1979 | White et al. ........................... | 56/341 X |
| 4,524,574 | 6/1985 | Ratzlaff ..................................... | 56/341 |
| 4,525,991 | 7/1985 | Naagtgeboren ........................... | 56/341 |
| 4,615,238 | 10/1986 | Cheatum . | |
| 4,999,987 | 3/1991 | Eggelmueller ........................... | 56/341 |

FOREIGN PATENT DOCUMENTS

299455A7  4/1992  German Dem. Rep. .
1 910 813  10/1969  Germany .
92 11 256 U  12/1992  Germany .

*Primary Examiner*—Heather Shackelford
*Attorney, Agent, or Firm*—Michael J. Striker

[57] ABSTRACT

A drive system for an agricultural large baler having a rearwardly open bale pressing chamber arranged in a longitudinal direction, a pressing piston reciprocatingly movable in the bale pressing chamber, devices for picking up of a harvested product from ground, a transporting passage for collecting a discharge portion of the harvested product and transporting the discharged portion into the bale pressing chamber by an additional transporting device, a binding device for binding a finally pressed bale as well as a drive for driving operational elements, the pressing piston having a crank arm forming a crank circle and provided with a drive shaft element for driving the pressing piston, an input shaft and a transmitting element through which a drive force is transmitted from the input shaft, and intermediate shaft to which the driving force is transmitted through the transmitting element from the input shaft, toothed gears fixedly connected with the intermediate shaft to which the drive force is transmitted, a drive shaft provided for operational elements and located outside of the crank circle of the crank arm so that the drive force is transmitted from the toothed gears to the drive shaft and further to the drive shaft element of the crank arm.

8 Claims, 2 Drawing Sheets

DRIVE SYSTEM FOR AGRICULTURAL LARGE BALER

BACKGROUND OF THE INVENTION

The present invention relates to a drive system for an agricultural large baler.

More particularly, it relates to a drive system for an agricultural large baler which has a rearwardly open bale pressing chamber arranged in a longitudinal direction, a pressing piston movable reciprocatingly in the chamber, devices for lifting harvested product from a field, a transporting passage for collecting an outlet portion of the harvested product and for its transportation into the bale pressing chamber by an additional transporting device, a binding device for binding finally pressed bales, as well as a drive system for driving all operational elements, wherein a drive shaft is located outside of a crank circle of a crank arm for driving the pressing piston.

A large baler of the above mention general type is disclosed in the German patent document DD 299 455. Large balers are usually pulled by field tractors and driven through a hinge shaft connected with a power take-off shaft of the field tractor. For reducing the manufacturing cost as well as for increasing the operational safety and the efficiency, it has been proposed to drive the crank arms for the pressing piston of the main transmission and all shafts for remaining operational elements from a drive shaft located outside the crank circle of the crank arm. The reduction of the input rotary speed of the hinge shaft which is substantially 1000 revolutions per minute does not provide any great rotary speed difference of the output at the drive shaft of the remaining operational elements and on the rotary speed of the crank arm for the pressing piston. For example the drive shaft rotates the remaining operational elements with approximately 200 revolutions per minute and the drive shaft for the crank arm with approximately 60 revolutions per minute. The relatively low rotary speed of the drive shaft of the remaining operational elements has a result that, from the shaft a high torque is transmitted, which makes necessary a corresponding substantial dimensioning of the subsequent transmission and force transmitting means such as shafts, chains, etc.

If this drive system is changed so that the higher rotary speed of the drive shaft of the remaining operational elements rotary speeds are possible, the diameter of the toothed gears in the main transmission changes. As a result, either the additional toothed gear stages are needed or individual toothed gears are so great that they can pass in the corresponding spaces with difficulties. Both features do not correspond to the objective of reduces the manufacturing costs and improving the efficiency. Because of the structural width of the large balers, it is difficult to run all drives from one shaft. In addition, the drive of the binding device must operate substantially synchronous to the drive of the pressing piston, for providing an optimal function without the danger of damages to the binding needle.

SUMMARY OF THE INVENTION

Accordingly, it is an object of present invention to propose a cost favorable and small size solution which provides a high rotary speed of the drive shaft for remaining operations without occupying substantial space for the main transmission.

Its also an object of present invention to arrange the drive of the binding device as direct as possible with the pressing piston.

In keeping with these objects which will become apparent hereinafter, one feature of present invention resides, briefly stated, in a drive in which the input shaft transmits the drive energy through a bevel gear stage or screw transmission to an intermediate shaft, from which the drive energy is transmitted through the toothed gears fixedly connected with the intermediate shaft to the drive shaft of the operational elements located outside the crank circle of the crank arm on the one hand, and to the drive shaft of the crank arms for driving the pressing piston on the other hand.

The arrangement of both toothed gears on an intermediate shaft provides for a greater band width with fixing of the corresponding output rotary speeds, without increase of the dimension of the transmission or additional toothed gear stages. Depending on the size of the bevel gears on the input shaft or the pitch of the screw stage and the plate or toothed gears which transmit the drive force from the input shaft to the intermediate shaft, the output rotary speed of a drive shaft located outside the crank circle of the crank arm can be for example 400 revolutions per minute or more, with a rotary speed of the drive shaft of a crank arm of approximately 50 revolutions per minute, while the inventive transmission is generally smaller than the transmission of the prior art. The higher drive rotary speed provides a cost-lowering weaker design of the subsequent elements for transmission of the drive force.

In accordance with a further embodiment of the present invention, the drive force can be transmitted to the drive shaft of the crank arm, and the input rotary speed is reduced to the rotary speed required for driving of the crank arm which drives the pressing piston, and from there the drive force is transmitted to the drive shaft through toothed gears located outside the crank circle of the crank arm, with increase of the rotary speed.

In accordance with a further embodiment of the present invention, the drive force for driving the binding device can be transmitted from the drive shaft of the crank arm for driving the pressing piston through at least one toothed gear stage and additional shafts or chain transmission to the binding device. When compared with a drive of the binding device through the drive shaft located outside of the crank circle of the crank arm, this construction provides the advantage that the lateral space at the side of the large baler is economized, since the force transmission for the binding device must not be passed laterally to the bale pressing chamber. With the present of the switching-off coupling for the receiving and transporting device, the drive of the binding device can be switched on independently and the binding device can be driven with better synchronization to the pressing piston, since in the proposed manner the additional gap from the toothed gears and side transmissions during driving through the shaft located outside the crank circle of the crank arm is dispensed with. Also, the drive forces for driving a hydraulic pump from the drive shaft of the crank arm for driving the pressing piston can be transmitted through at least one toothed gear stage to the hydraulic pump. The hydraulic pump can be arranged between the crank arms on one side of the main transmission or at another location of the main transmission, for example on a shaft trunnion.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
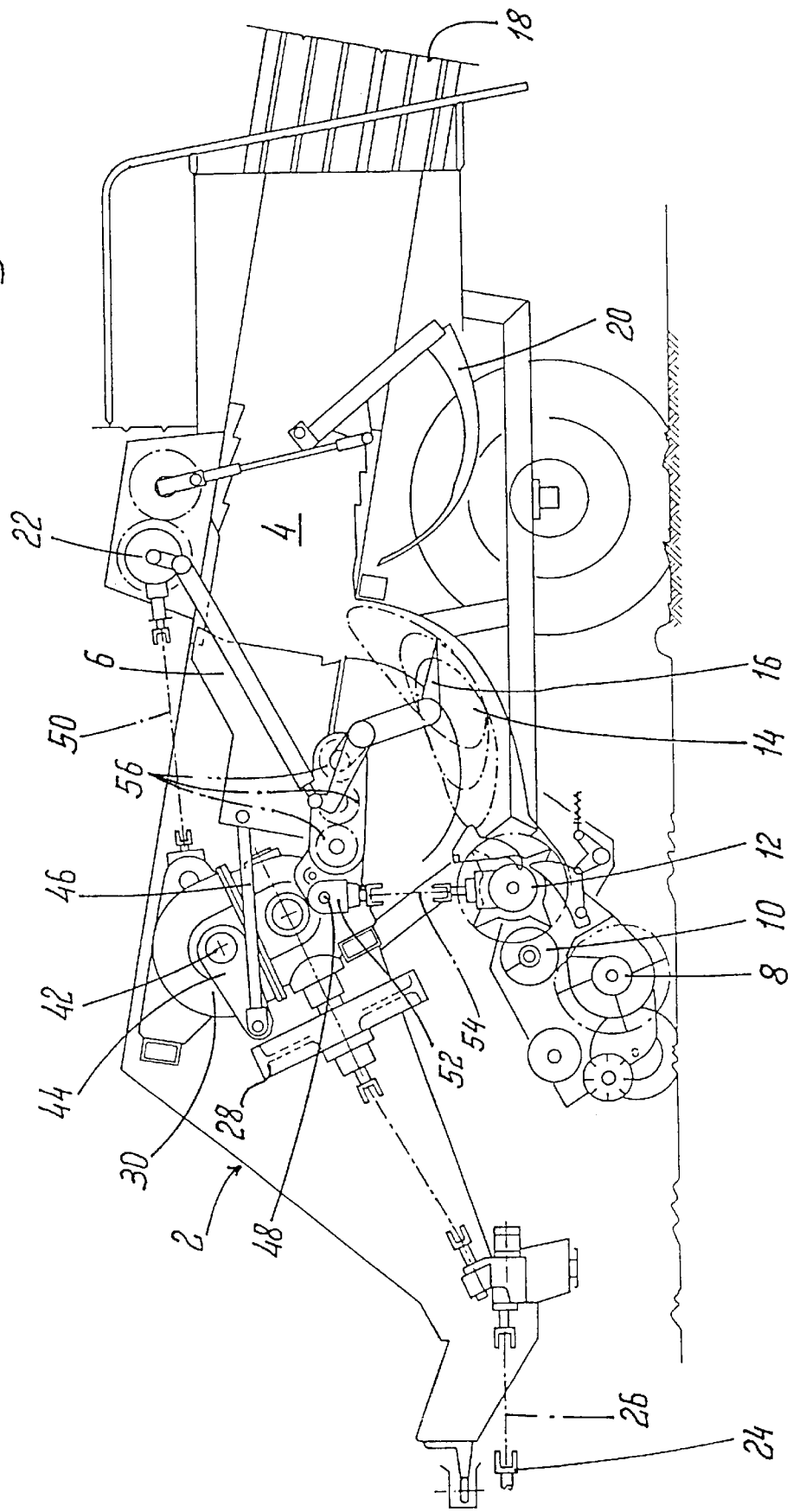
FIG. 1 is a side view of an agricultural large baler in accordance with the present invention.

An agricultural large baler is identified in FIG. 1 with reference numeral 2. It has a bale pressing chamber 4 with a pressing piston 6 which is reciprocatingly movable in the chamber. A receiving device 8 is arranged under the main transmission. It picks up the harvested product from ground and supplies it through lateral transporting screws 10 centrally together to the cutting device 12. From there, the harvested product is further transported into a transporting passage 14, in which it is collected and thrown out by a transporting device 16 as a discharge portion into the bale pressing chamber 4.

In the bale pressing chamber 4, the piston 6 performs its cyclical movements during which it releases its supply opening to the bale pressing chamber 4. In the pressing chamber 4 the supplied discharge portion is pressed by the stroke movement of the pressing piston 6 against the previously pressed product. It is thereby compacted and finally displaced with the previously pressed product in direction toward a discharge end 18 of the bale pressing chamber 4. With a release signal, a binding needle 20 moves with a turning movement of a binding thread through the bale strand to the binding device 22, in which the binding thread is cut and knotted. The finally knotted bale can be moved through the discharge end 18 onto the field.

For the invention, it does not matter whether a cutting device 12 is available, or the transporting device 16 operates in the above described way or in the way in accordance with the prior art, for example as a rotation transporter, or whether several transporters are available, or whether the transporting device performs one or several stroke movements during a pressing stroke of the piston 6. The above described elements are known as to their operation for a drive system.

The drive of the operation elements of the gross baler is performed through a hinge shaft 26 which is connected with a power pickup shaft 24 of a not shown field tractor. The hinge shaft 26 opens into a main transmission 30 through an intermediate flywheel gear 28. The drive shaft branches in the main transmission 30 into a drive shaft 42 on which a crank arm 44 is fixedly mounted, and which transmits the drive force through a connecting rods 46 to the pressing piston 6, and to a drive shaft 48 which is arranged outside the crank circle of the crank arms 44. While the drive of the binding device 22 is performed through toothed gears and the hinge shaft 50, the receiving device 8 and the cutting device 12 are driven through a common transmission 52 and a hinge shaft 54 from an output shaft 48. The transporting device 16 is driven by spur gears 56 which are in operative communication with one another, through a group arranged laterally of the large baler 2. The first toothed gear is also drivingly connected with the drive shaft 48 through a not shown shaft and a toothed gear set.

Figure 2:
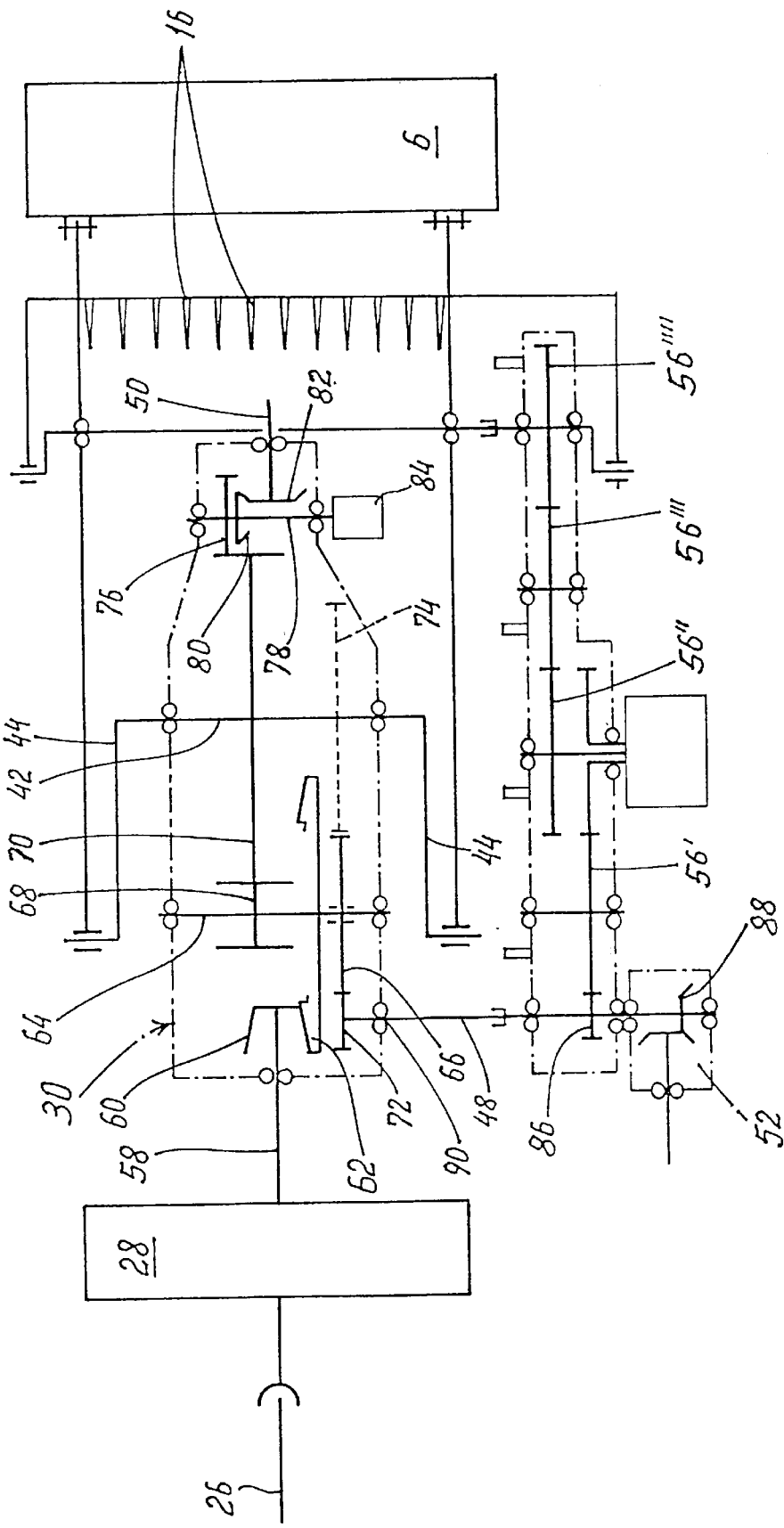
FIG. 2 is a view schematically showing a drive system of the inventive agricultural large baler.

FIG. 2 schematically shows the basic concept of the drive. An input shaft 58 acts through a bevel gear 60 on a plate gear 62 which is fixedly connected with an intermediate shaft 64. The rotary movement of the input shaft 58 is transmitted through the bevel gear stage 60, 62 to the intermediate shaft 64. Instead of the bevel gear stage 60, 62, also a solution with a screw drive and a toothed gear engaging in the screw drive and fixedly mounted on the intermediate shaft 64 can be provided as well. Similarly, toothed gears 66 and 68 are fixedly connected with the intermediate shaft 64. While the toothed gear 68 transmits the drive force through the fixedly mounted toothed gear 70 to the drive shaft 42 which drives the crank arm 44, the toothed gear 66 transmits the drive force to the toothed gear 72 fixedly arranged on the drive shaft 48. The drive shaft 48 is supported outside of the crank circle of the crank arm 44. Alternatively, for transmission of the drive force through the toothed gears 66, 72, the drive force is transmitted through a toothed gear 74 which is mounted fixedly on the shaft 42 and shown in a broken line, when the toothed gear 66 is rotatably supported on the shaft 64. In this case, the transmission of the drive force from the shaft 42 through the toothed gears 74, 66, 72 to the drive shaft 48 is performed.

The toothed gear 70 is in engagement with the toothed gear 76 which is fixedly mounted on a shaft 78. Also, a bevel gear 80 is mounted fixedly on the shaft 74 and transmits a drive force received from the toothed gear 70 to the bevel gear 82 fixedly mounted on the shaft 50. In this way the drive force can be transmitted through the shaft 50 to the binding device. Also, a hydraulic motor 84 is drivingly connected with the shaft 78 and laterally mounted on the main transmission 30. A hydraulic motor can be also drivingly connected with the intermediate shaft 64.

In deviation from FIG. 1, the drive shaft 48 in FIG. 2 acts not through a toothed gear stage, but instead directly onto the angular transmission 52. Toothed gears 86, 88 are fixedly connected with the drive shaft 48 and transmit the drive force with suitable means to the transporting device or the receiving device, and if available to the cutting device. With the relatively high rotary speed of the toothed gear 72, the drive shaft 48, the bearing 90, the housing 52 as well as the shaft 48 can be designed weaker because of the reducing moment, then in the case of lower rotary speeds of the toothed gear 72. This leads to a cost economy. Also, the inventive solution needs a smaller space.

It will be understood that each of the elements described above, or two or more together, may also find a useful application in other types of constructions differing from the types described above.

While the invention has been illustrated and described as embodied in drive system for agricultural large baler, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. An agricultural large baler, comprising a rearwardly open bale pressing chamber arranged in a longitudinal direction; a pressing piston reciprocatingly movable in the bale pressing chamber; devices for picking up of a harvested product from ground; a transporting passage for collecting a discharge portion of the harvested product and transporting the discharged portion into the bale pressing chamber by an additional transporting device; a binding device for binding a finally pressed bale; a drive system for driving operational elements, said drive system including a crank arm forming a crank circle and provided with a drive shaft element for driving said pressing piston, an input shaft, a transmitting element through which a drive force is transmitted from said input shaft, an intermediate shaft to which the driving force is transmitted through said transmitting element from said input shaft, toothed gears fixedly connected with said intermediate shaft to which the drive force is transmitted, a drive shaft provided for operational elements and located outside of said crank circle of said crank arm so that the drive force is transmitted from said toothed gears to said drive shaft and further to said drive shaft element of said crank arm for driving said pressing piston, and at least one toothed gear stage and an additional element operatively connected between the least at least one toothed gear stage and said binding device and arranged so that the drive force is transmitted from said drive shaft element of said crank arm for driving said pressing piston through said at least one toothed gear stage and said additional element to said binding device.

2. An agricultural baler as defined in claim 1, wherein said transmitting element is formed as a bevel gear stage.

3. An agricultural baler as defined in claim 1, wherein said transmitting element is formed as a screw transmission.

4. An agricultural baler as defined in claim 1, wherein the drive force is transmitted to said drive shaft element of said crank arm so that an input rotary speed is reduced to a rotary speed required for driving said crank arm which drives said pressing piston, and from there the drive force is transmitted to said drive shaft located outside said crank circle of said crank arm through said toothed gears with an increase of the rotary speed.

5. An agricultural baler as defined in claim 1, wherein said additional element is formed as an additional shaft.

6. An agricultural baler as defined in claim 1, wherein said additional element is formed as a chain transmission.

7. An agricultural baler as defined in claim 1, and further comprising a hydraulic pump; and a toothed gear arranged so that said drive force is transmitted to said hydraulic pump from said drive shaft element of said crank arm for driving said pressing piston through said at least one toothed gear.

8. An agricultural baler as defined in claim 7, and further comprising a main transmission, said hydraulic pump being arranged at one side of said main transmission.

* * * * *